(12) United States Patent
Imanishi et al.

(10) Patent No.: US 6,738,323 B1
(45) Date of Patent: May 18, 2004

(54) OPTICAL DISC APPARATUS AND FOCUSING CONTROL METHOD IN AN OPTICAL DISC APPARATUS

(75) Inventors: Shingo Imanishi, Kanagawa (JP); Masanobu Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 724 days.

(21) Appl. No.: 09/631,172

(22) Filed: Aug. 2, 2000

(30) Foreign Application Priority Data

Aug. 11, 1999 (JP) .......................... P11-227016

(51) Int. Cl.[7] ................................. G11B 7/00
(52) U.S. Cl. .................. 369/44.32; 369/44.23
(58) Field of Search ........................ 369/13.28, 13.29, 369/13.33, 44.11, 44.41, 53.23, 53.28, 53.3, 53.43, 112.22, 112.23, 112.24, 44.23, 44.32, 112.05

(56) References Cited

U.S. PATENT DOCUMENTS 5,125,750 A * 6/1992 Corle et al. ............... 369/43
5,638,207 A * 6/1997 Fukuzawa et al. .......... 359/375
6,449,221 B1 * 9/2002 Knight et al. ............. 369/13.35

FOREIGN PATENT DOCUMENTS

JP 11175987 A * 7/1999 ............ G11B/7/09

* cited by examiner

*Primary Examiner*—Thang V. Tran
*Assistant Examiner*—Bach Vuong
(74) *Attorney, Agent, or Firm*—Oblon, Spivak, McClelland, Maier & Neustadt, P.C.

(57) ABSTRACT

It is intended to perform a focusing control reliably in near-field recording in, for example, an exposing apparatus that performs exposure of an original disc by near-field recording (NFR). An objective lens is moved based on a light quantity detection result of an interference light beam that is produced by interference between light reflected by a disc-shaped recording medium and light reflected by the exit surface of the objective lens.

9 Claims, 2 Drawing Sheets

14
LIGHT SHIELD REGION
TRANSMISSION REGION
L1R

OPTICAL DISC APPARATUS AND FOCUSING CONTROL METHOD IN AN OPTICAL DISC APPARATUS

BACKGROUND OF THE INVENTION

1. Field of the Invention

The present invention relates to an optical disc apparatus and a focusing control method in an optical disc apparatus. For example, the invention can be applied to an exposing apparatus that performs exposure of an original disc by near-field recording (NFR). The invention makes it possible to perform a focusing control reliably in near-field recording by moving an objective lens based on a light quantity detection result of an interference light beam produced by interference between light reflected by a disc-shaped recording medium and light reflected by the exit surface of the objective lens.

2. Description of the Related Art

Conventionally, exposing apparatuses have been proposed that record desired data at a high density on an original disc that is a disc-shaped recording medium by near-field recording. For such exposing apparatuses, a focusing control method has been proposed in which a focusing control is performed by using, as a reference, the light quantity of part of a recording laser beam that is reflected through total reflection by the exit surface of an objective lens.

In the near-field recording, a recording laser beam is converged on the exit surface of an objective lens whose numerical aperture is greater than or equal to 1, whereby a very small beam spot is formed by the objective lens's converging the recording laser beam. Further, in the near-field recording, the objective lens is disposed very close to an original disc and the original disc is exposed to part of a recording laser beam that leaks from the tip of the objective lens by the near-field effect.

Where the distance between the objective lens and the original disc is large and the near-field effect does not occur, a component of a recording laser beam converged oh the exit surface of the objective lens that shines on the exit surface at angles larger than the critical angle is fully reflected through total reflection by the exit surface and returned to the light source side. The quantity of light that returns to the light source side gradually decreases as the distance decreases and the near-field effect becomes stronger accordingly. In a focusing control that uses the total reflection component as a reference, the objective lens is moved along the optical axis so that the quantity of light that shines on the exit surface of the objective lens at angles larger than the critical angle and hence returns to the light source side becomes a prescribed value.

However, because of various problems, the focusing control using such a total reflection component as a reference has not been put in practical use yet.

In exposing apparatuses, there may occur a case of changing the light quantity of a recording laser beam depending on the exposure conditions. In such a case, in the focusing control using the total reflection component as a reference, the quantity of light returning to the light source side that is the subject of the focusing control also varies. Therefore, it is necessary to re-set the reference of the focusing control, requiring cumbersome manipulations.

The focusing control using the total reflection component as a reference has another problem that the quantity of light that returns to the light source side cannot be detected with a sufficiently large SN ratio, which prevents a stable focusing control.

In exposing apparatuses, a latent image of a pit array is formed by on/off-controlling a recording laser beam. The focusing control using the total reflection component as a reference has another problem that a detection result of light quantity that returns to the light source side is modulated by the on/off control, which also prevents a stable focusing control. This problem may be solved by eliminating a component corresponding to the modulation of the recording laser beam by a filter. However, in the frequency band of a focusing control, there may occur a case that such a component cannot be eliminated completely, in which case such a component remains as a noise component.

One method for solving the above problems is to generate a separate laser beam having a wavelength that is out of the sensitive range of an original disc and detect the light quantity of a total reflection component of this laser beam. However, this method has a problem that the accuracy lowers due to the optical system chromatic aberration. Further, there may occur a case that it is physically difficult to detect total reflection return light.

SUMMARY OF THE INVENTION

The present invention has been made in view of the above circumstances in the art, and an object of the invention is therefore to provide an optical disc apparatus and a focusing control method in an optical disc apparatus that can perform a focusing control reliably in near-field recording.

To attain the above object, the invention provides an optical disc apparatus and a focusing control method in an optical disc apparatus in which an interference light beam produced by interference between light reflected by a disc-shaped recording medium and light reflected by the exit surface of an objective lens is detected and the objective lens is moved along its optical axis based on a light quantity detection result of the interference light beam.

In the above optical disc apparatus and focusing control method, an interference light beam produced by interference between light reflected by the disc-shaped recording medium and light reflected by the exit surface of the objective lens is detected and the objective lens is moved along its optical axis based on a light quantity detection result of the interference light beam. Therefore, a focusing control can be performed by detecting a variation in the interval between the disc-shaped recording medium and the exit surface of the objective lens stably with accuracy that corresponds to the wavelength of a focusing laser beam from which the interference light beam is produced. The focusing control can be performed with so much higher accuracy.

DETAILED DESCRIPTION OF THE PREFERRED EMBODIMENTS

An embodiment of the present invention will be hereinafter described in detail with reference to the accompanying drawings.

1. Configuration of the Embodiment

Figure 1:
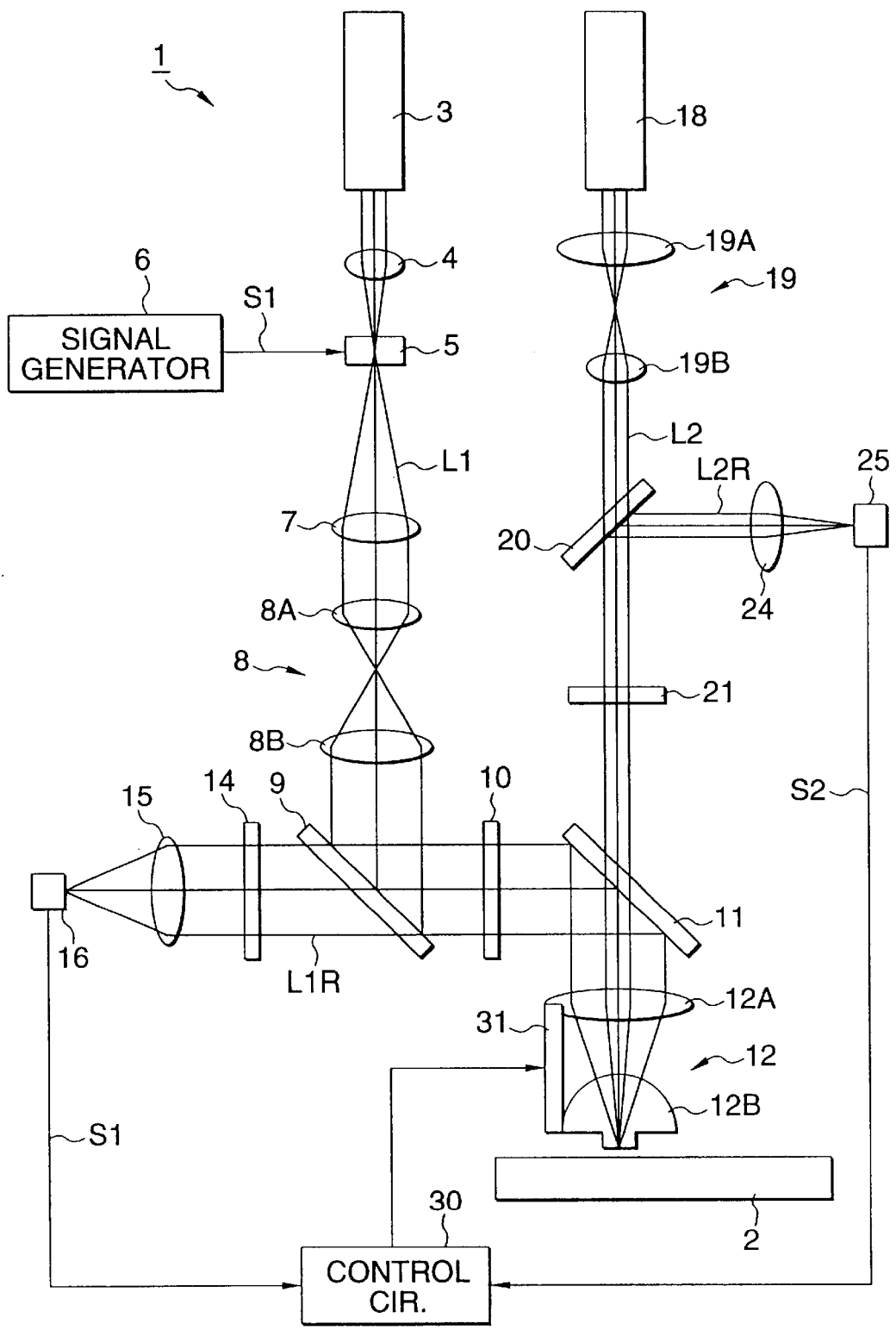
FIG. 1 is a schematic diagram showing an exposing apparatus according to an embodiment of the present invention.

FIG. 1 is a schematic diagram showing an exposing apparatus according to the embodiment of the invention. This exposing apparatus 1 forms tracks on an original disc 2 in spiral form and forms a latent image of a pit array on the tracks by applying a recording laser beam L1 to the original disc 2 while gradually moving the beam application position outward in a state that the original disc 2 is rotationally driven by a prescribed driving mechanism.

In the exposing apparatus 1, a laser light source 3 which is a Kr laser emits a recording laser beam L1 having a prescribed wavelength. A lens 4 converts the recording laser beam L1 into a converging beam, which is input to an AOM (acousto-optic modulator) 5. The AOM 5 on/off-modulates the recording laser beam L1 with a modulation signal S1 that is output from a signal generator 6, and outputs a modulated light beam. The signal generator 6 generates the modulation signal S1 that corresponds to a pit array to be formed.

A lens 7 converts the output light beam of the AOM 5 into a parallel beam and outputs it. Lenses 8A and 8B constitute a beam expander 8 which expands the output light beam of the lens 7 and thereby forms a light beam having a prescribed, larger diameter. A polarizing beam splitter 9 reflects the output light beam of the beam expander 8, and transmits a return light beams L1R of the recording laser beam L1 that enters the polarizing means splitter 9 after tracing the optical path of the reflected recording laser beam in the opposite direction, thereby separating the recording laser beam L1 and the return light beam L1R from each other.

A quarter-wave plate 10 converts the recording laser beam L1 that is output from the polarizing beam splitter 9 into a circularly polarized light beam by giving a phase difference to it, and outputs the circularly polarized light beam. Further, the quarter-wave plate 10 converts a circularly polarized return light beam L1R that is to enter the polarized beam splitter 9 into a linearly polarized light beam whose polarization plane is perpendicular to the polarization plane of the original recording laser beam L1 by similarly giving a phase difference to the return light beam L1R, and outputs the resulting linearly polarized light beam to the polarizing beam splitter 9.

A dichroic mirror 11 reflects, toward an original disc 2, the recording laser beam L1 that is output from the quarter-wave plate 10, and reflects, toward the quarter-wave plate 10, a return light beam L1R coming from the original disc 2. Further, the dichroic mirror 11 transmits a focusing laser beam L2 that is different in wavelength than the recording laser beam L1 toward the original disc 2, and transmits and outputs an interference light beam L2R that is produced from the focusing laser beam L2 and comes from the original disc 2.

An objective lens system 12 consists of a pair of lenses, what is called a rear lens 12A and a front lens 12B. The rear hemispherical-ended lens 12A converts the recording laser beam L1 into a converging beam, which is converged on the exit surface of the front hemispherical-ended lens 12B by the rear-hemispherical-ended-lens-side lens surface of the front hemispherical-ended lens 12B. In this manner, the front hemispherical-ended lens 12B of the objective lens system 12 serves as an SIL (solid immersion lens), the numerical aperture of the entire objective lens system 12 is set greater than or equal to 1, and the objective lens system 12 applies the recording laser beam L1 to the original disc 2 by the near-field effect. The front hemispherical-ended lens 12B is formed in such a manner that a central portion of its original-disc-side surface projects to assume a cylindrical shape, thereby preventing collision of the front lens edge against the original disc 2 in existing tilt between the front lens and the original disc.

In the exposing apparatus 1, when a recording laser beam L1 is applied to the original disc 2, a return light beam L1R is produced from the original disc 2 and the exit surface of the objective lens system 12. The return light beam L1R traces the optical path of the recording laser beam L1 in the opposite direction and passes through the polarizing beam splitter 9, and is thereby separated from the recording laser beam L1.

Figure 2:
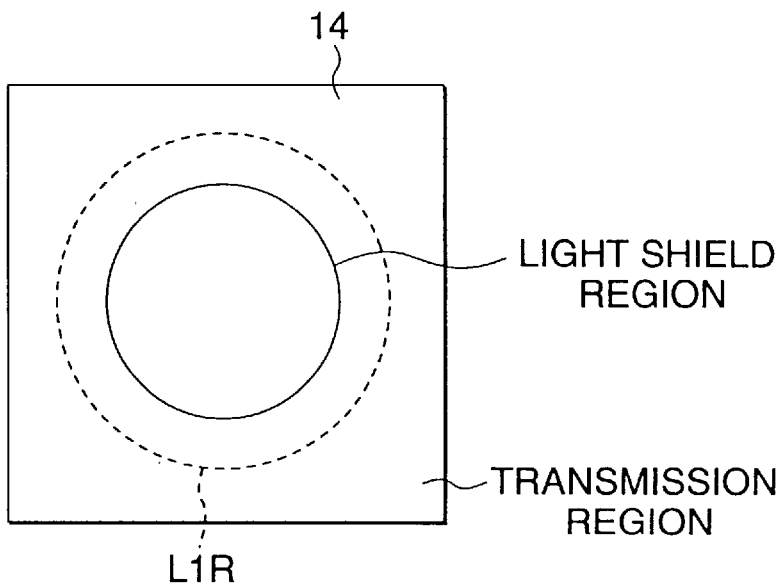
FIG. 2 is a plan view of a mask used in the exposing apparatus of FIG. 1.

A mask 14 is disposed on the optical path of the return light beam L1R that is output from the polarizing beam splitter 9. The mask 14 interrupts a paraxial ray of the return light beam L1R and thereby selectively transmits a component corresponding to part of the recording laser beam L1 that shined on the exit surface of the objective lens system 12 at angles larger than the critical angle. To this end, as shown in FIG. 2, the mask 14 is configured in such a manner that a light shield region having a smaller diameter than the return light beam L1R is formed on a transparent parallel plate so as to occupy its central portion. That is, in the return light beam L1R, part of the recording laser beam L1 that shines on the exit surface of the objective lens system 12 at angles smaller than the critical angle is reflected by the exit surface of the objective lens system 12 and the original disc 2 and resulting reflection beams interfere with each other. In the exposing apparatus 1, a component of the return light beam L1R corresponding to such reflection beams that interfere with each other is eliminated by the mask 14. The return light beam L1R is processed in this manner.

A lens 15 converges part of the return light beam L1R that has passed through the mask 14 on a photodetector 16. The photodetector 16 outputs a light quantity detection result S1 of the return light beam L1R. The mask 14 serves to prevent a variation of the light quantity detection result S1 that would otherwise be caused by interference between reflection beams.

Figure 3:
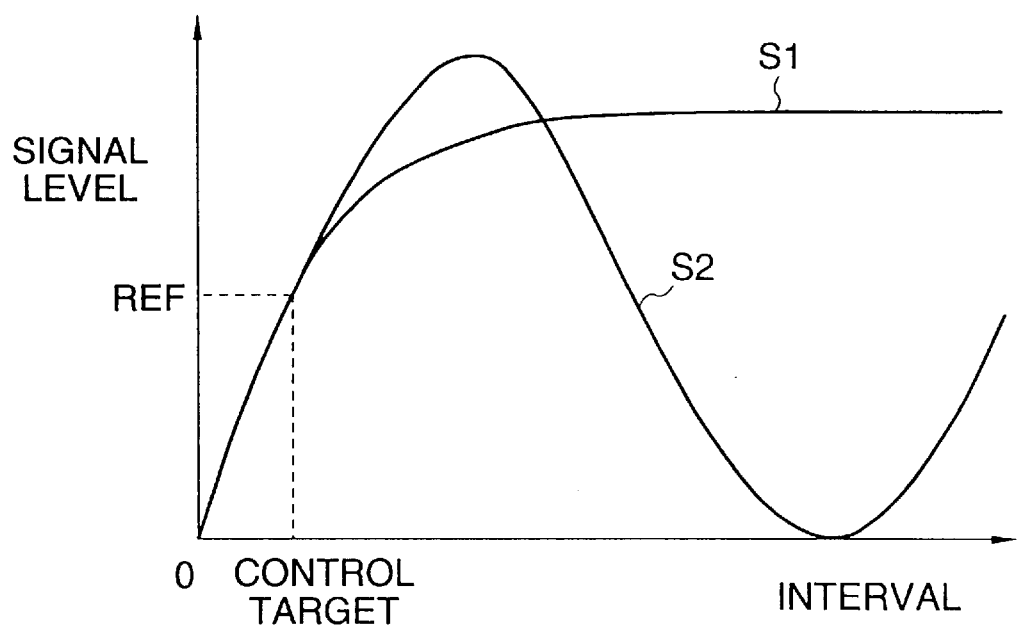
FIG. 3 is a graph showing characteristic curves of light quantity detection results in the exposing apparatus of FIG. 1.

Configured as described above, the exposing apparatus 1 can detect the light quantity of part of a recording laser beam L1 that is reflected through total reflection by the exit surface of the objective lens system 12. As shown in FIG. 3, the light quantity detection result S1 that is obtained in the above manner is kept at a constant signal level when the objective lens system 12 is separated from the original disc 2 by more than a prescribed distance. After the distance between the objective lens system 12 and the original disc 2 has become shorter than the prescribed distance, the signal level decreases as the interval between the tip of the objective lens system 12 and the original disc 2 becomes shorter.

A laser light source 18, which is a He—Ne laser, emits a focusing laser beam L2 having a wavelength that is different from the wavelength of a recording laser beam L1 and is out of the sensitive range of the original disc 2. Lenses 19A and 19B constitute a beam expander 19 which converts the focusing laser beam L2 into a light beam having a shorter diameter. A polarizing beam splitter 20 transmits the output light beam of the beam expander 19, and reflects an interference light beam L2R of the focusing laser beam L2 that enters the polarizing means splitter 20 after tracing the optical path of the transmitted light beam in the opposite direction, thereby separating the focusing laser beam L2 and the interference light beam L2R from each other.

A quarter-wave plate 21 converts the focusing laser beam L2 that is output from the polarizing beam splitter 20 into a circularly polarized light beam by giving a phase difference to the focusing laser beam L2, and outputs it toward the dichroic mirror 11. Further, the quarter-wave plate 21 converts the circularly polarized interference light beam L2R coming from the dichroic mirror 11 toward the polarizing beam splitter 20 into a linearly polarized light beam whose polarization plane is perpendicular to the polarization plane of the original focusing laser beam L2 by similarly giving a phase difference to the interference light beam L2R, and outputs the resulting linearly polarized light beam to the polarizing beam splitter 20.

In the above-configured exposing apparatus 1, a small-diameter focusing laser beam L2 that is different in wavelength than a recording laser beam L1 is input to the objective lens system 12 and applied to the original disc 2 together with the recording laser beam L1. In the exposing apparatus 1, the focusing laser beam L2 is input to the objective lens system 12 as a paraxial ray.

The focusing laser beam L2 is reflected by the exit surface of the objective lens system 12 and the surface of the original disc 2. Resulting reflection beams interfere with each other because in the exposing apparatus 1 the objective lens system 12 and the original disc 2 are disposed so close to each other as to be suitable for near-field recording. In the exposing apparatus 1, the interference light beam L2R produced from those reflection beams traces the optical path of the focusing laser beam L2 in the opposite direction and shines on the polarizing beam splitter 20. Reflected by the polarizing beam splitter 20, the interference light beam L2R is separated from the focusing laser beam L2.

A lens 24 converges the interference beam L2R that is reflected by the polarizing beam splitter 20 on a photodetector 25, which outputs alight quantity detection result S2. As shown in FIG. 3, in the light quantity detection result S2, the signal level varies in a sinusoidal manner with the interval between the tip of the objective lens system 12 and the original disc 2 at a period that is a half of the wavelength λ of the focusing laser beam L2.

A control circuit 30 focusing-controls the objective lens system 12 by driving an actuator 31 based on the light quantity detection results S1 and S2.

Specifically, when instructed by an operator to start an exposing operation, the control circuit 30 causes the objective lens system 12 to be moved to a position opposed to a region of the original disc 2 that is irrelevant to recording of a pit array, for example, an inside region of the original disc 2.

Then, the control circuit 30 drives the signal generator 6 to apply a recording laser beam L1 continuously to the above region. In this state, the control circuit 30 drives the actuator 31 to gradually bring the objective lens system 12 close to the original disc 2 and monitors the light quantity detection result S1 that relates to the total reflection. If the control circuit 30 judges, based on the light quantity detection result S1 relating to the total reflection, that the signal level has started to decrease and hence the objective lens system 12 has come close to the original disc 2 to such an extent that the near-field effect occurs and that the objective lens system 12 has then come close to the original disc 2 to such an extent that the interval is equal to a control target, the control circuit 30 starts a focusing control with a feedback loop in which the light quantity detection result S2 of an interference light beam L2R is used as a reference. In the focusing control, the control circuit 30 drives the actuator 31 so that an error signal between a reference voltage REF corresponding to the control target and the light quantity detection result S2 of the interference light beam L2R becomes zero.

After the focusing control was started in the above manner by using the light quantity detection result S2 of the interference light beam L2R as a reference, the control circuit 30 stops the continuous application of the recording laser beam L1 by controlling the operation of the signal generator 6 and then moves the objective lens system 12 to an exposure start position. Then, the control circuit 30 causes the signal generator 6 to start modulating the recording laser beam L1 and thereby starts exposure of the original disc 2 from the exposure start position.

2. Operation of the Embodiment

In the exposing apparatus 1 having the above configuration (see FIG. 1), when an operator places an original disc 2 and instructs to start exposure, rotational driving on the original disc 2 is started and under the control of the control circuit 30 the objective lens system 12 is moved to a position opposed to a region of the original disc 2 that is irrelevant to recording of a pit array, for example, an inside region of the original disc 2.

In this state, in the exposing apparatus 1, a recording laser beam L1 starts to be emitted from the laser light source 3. The recording laser beam L1 is expanded by the beam expander 8 into a light beam having a prescribed diameter, introduced to the objective lens system 12 via the polarizing beam splitter 9 and the dichroic mirror 11, and converged on the exit surface of the objective lens system 12, that is, the tip of the front hemispherical-ended lens 12B. Part of the recording laser beam L1 that is reflected by the exit surface, part of the recording laser beam L1 that goes out of the exit surface and is reflected by the original disc 2, and other beams constitute a return light beam L1R, which traces the optical path of the recording laser beam L1 in the opposite direction and passes through the polarizing beam splitter 9. A component of the return light beam L1R corresponding to light that shined on the exit surface of the objective lens system 12 at angles larger than the critical angle is selectively transmitted through the mask 14 (see FIG. 2) and its light quantity is detected by the photodetector 16.

In this manner, in the exposing apparatus 1, the light quantity of the component of the return light beam L1R that corresponds to the part of the recording laser beam L1 that shined on the exit surface of the objective lens system 12 is detected. When the objective lens system 12 comes close to the original disc 2 to such an extent that the interval is suitable for near-field recording, decrease in the light quantity of the return light beam L1R comes to be observed in the light quantity detection result S1 (see FIG. 3).

In the exposing apparatus 1, while the recording laser beam L1 is continuously applied to the original disc 2, driven by the actuator 31 the objective lens system 12 is gradually brought close to the original disc 2 until decrease in the signal level is found in the light quantity detection result S1 of the return light beam L1R, that is, until the objective lens system 12 comes close to the original disc 2 to such an extent that the interval is suitable for near-field recording.

Further, when it is found through the monitoring of the light quantity detection result S1 of the return light beam L1R that the objective lens system 12 has come close to the original disc 2 to such an extent that the interval is approximately equal to the control target, the focusing control servo loop is turned on and the objective lens system 12 is focusing-controlled so that the light quantity detection result S2 of the photodetector 25 becomes the prescribed voltage REF.

Specifically, in the exposing apparatus 1, a focusing laser beam L2 that is different in wavelength than a recording laser beam L1 is emitted from the laser light source 18. The focusing laser beam L2 is reduced in diameter by the beam expander 19 and then introduced to the objective lens system 12 via the polarizing beam splitter 20 and the dichroic mirror 11. At this time, the focusing laser beam L2 is input to the objective lens system 12 as a paraxial ray with respect to the optical axis of the objective lens system 12. As a result, reflection beams are obtained from the exit surface of the objective lens system 12 and the surface of the original disc 2 and received by the photodetector 25 as an interference light beam L2R.

As for the light quantity detection result S2 of the interference laser beam L2R, the signal level varies in a sinusoidal manner with the interval between the exit surface of the objective lens system 12 and the original disc 2. Therefore, a variation in interval can be detected with high accuracy. Further, as for the light quantity detection result S2, since the focusing laser beam L2 is different in wavelength than the recording laser beam L1, a variation in interval can be detected without being influenced by the on/off modulation of the recording laser beam L1 and hence detected with a large SN ratio.

However, although the light quantity detection result S2 allows accurate detection of a variation in interval because the signal level varies in a sinusoidal manner at a period that is equal to a half of the wavelength of the focusing laser beam L2, even with the detection result S2 it is difficult to correctly detect the absolute value of the interval. In conclusion, where a focusing control is started by using only the light quantity detection result S2 as a reference, it is difficult to assure that the interval is within the near-field range.

In contrast, a focusing control can be performed with high accuracy while the fact that the interval is within the near-field range is assured reliably if the focusing control using the light quantity detection result S2 of the interference light beam L2R as a reference is started after the interval has fallen within the near-field range where the signal level of the light quantity detection result S1 relating to the total reflection is lower than the prescribed level.

In the exposing apparatus 1, after a focusing control using the light quantity detection result S2 of the interference light beam L2R as a reference is started in the above manner, a latent image of a pit array can be formed on the original disc 2 starting from a prescribed exposure start position by applying a recording laser beam L1 to it while driving the AOM 5 with the signal generator 6.

Since the focusing laser beam L2 is different in wavelength than the recording laser beam L1, the light quantity of the focusing laser beam L2 is not varied by the on/off modulation of the recording laser beam L1. Therefore, the exposing apparatus 1 can perform the focusing control in a stable manner. The focusing control can be performed stably and reliably even in a case where the light quantity detection result S1 of the total reflection component cannot provide a sufficiently large SN ratio. Further, the focusing control can be performed stably without being influenced by the chromatic aberration of the objective lens system 12.

Still further, since an interference light beam L2R is produced in such a manner that a focusing laser beam L2 enters the objective lens system 12 as a paraxial ray having a small diameter, most of the interference light beam L2R serves as a coherent component that reflects the interval between the original disc 2 and the objective lens system 12 in contrast to the case of a return light beam L1R part of which is interrupted by the mask 14. Therefore, the light quantity detection result S2 makes it possible to detect a variation in the interval between the original disc 2 and the objective lens 12 with a so much higher SN ratio and detection sensitivity. When necessary, the light quantity of the focusing laser beam L1 can be increased. This makes it possible to increase the SN ratio and hence the detection accuracy.

3. Advantages of the Embodiment

With the above configuration, a focusing control is performed by moving the objective lens system 12 based on a light quantity detection result of an interference light beam that is produced by interference between light reflected by the original disc and light reflected by the exit surface of the objective lens system 12, whereby the focusing control can be performed reliably in near-field recording.

By also inputting a focusing laser beam to the objective lens system 12 as a paraxial ray with respective to the optical axis of the objective lens system 12, a sufficiently high SN ratio and detection sensitivity can be secured in a light quantity detection result of an interference light beam.

By moving the objective lens system 12 along its optical axis based on the light quantity detection result of the interference light beam in a state that the light quantity of a return light beam produced by total reflection is in a range including a prescribed light quantity, the focusing control can be performed in a state that the interval between the original disc 2 and the objective lens system 12 is set reliably in a near-field range.

That is, when the light quantity of the return light beam produced by total reflection has become smaller than the prescribed light quantity after the interval between the objective lens system 12 and the original disc 2 was decreased gradually, the operation is switched to a focusing control to be performed based on the light quantity detection result of an interference light beam. This makes it possible to perform the focusing control reliably in a near-field range.

By applying, to the original disc, a focusing laser beam that is separate from and different in wavelength than a recording laser beam, a focusing control can be performed reliably even in a case where a latent image of a pit array is formed by on/off-modulating the recording laser beam.

4. Other Embodiments

Although the above embodiment is directed to the case where a latent image of a pit array is formed by an exposing apparatus, the invention is not limited to such a case and can broadly be applied to other various cases including a case where a latent image of grooves is formed and a case where a latent image of a combination of a pit array and grooves is formed.

Although the above embodiment is directed to the case where a focusing laser beam that is separate from a recording laser beam is used, the invention is not limited to such a case. As long as sufficient characteristics for practical use are obtained, a recording laser beam may also be used as a focusing laser beam. In this case, for example, a configuration is possible in which, instead of using the mask 14, a parallel plate having a local mirror surface is disposed to separate a paraxial component and a total reflection component from a return light beam of the recording laser beam and a light quantity detection result of the paraxial component is employed as a light quantity detection result of an interference light beam. In this configuration, to avoid influence of the on/off control on the recording laser beam, it is conceivable to sample the light quantity detection result. Since this simplifies the structure of the optical system, the entire configuration can be simplified when the invention is applied to a case where desired data is recorded on an optical disc by using the near-field effect.

Although the embodiment is directed to the case where the invention is applied to an exposing apparatus, the invention is not limited to such a case and can broadly be applied to various optical disc apparatuses that record desired data on a disc-shaped recording medium by using the near-field effect.

As described above, according to the invention, by moving the objective lens system based on a light quantity detection result of an interference light beam produced by interference between light reflected by a disc-shaped recording medium and light reflected by the exit surface of the objective lens system, a focusing control can be performed reliably in near-field recording.

What is claimed is:

1. An optical disc apparatus which records desired data on a disc-shaped recording medium by near-field recording that uses an objective lens being held close to the disc-shaped recording medium, comprising a focusing control mechanism for keeping an interval between a surface of the disc-shaped recording medium and an exit surface of the objective lens at a prescribed value, the focusing control mechanism comprising:

a light source for emitting a focusing laser beam having a prescribed wavelength;

an illumination optical system for introducing the focusing laser beam to the objective lens and applying the focusing laser beam to the disc-shaped recording medium via the objective lens;

a photodetecting optical system for detecting an interference light beam produced by interference between light reflected by the disc-shaped recording medium and light reflected by the exit surface of the objective lens, and outputting a light quantity detection result; and moving means for moving the objective lens along an optical axis thereof based on the light quantity detection result of the interference light beam.

2. The optical disc apparatus according to claim 1, wherein the illumination optical system inputs the focusing laser beam to the objective lens as a paraxial ray with respect to the optical axis of the objective lens.

3. The optical disc apparatus according to claim 1, further comprising return light detecting means for detecting a component of a return light beam that returns from the objective lens and corresponds to part of a laser beam that goes toward the disc-shaped recording medium and shines on the exit surface of the objective lens at angles larger than a critical angle, and outputting a light quantity detection result, and wherein the moving means moves the objective lens along the optical axis based on the light quantity detection result of the interference light beam in a state that the light quantity detection result of the return light beam indicates that a light quantity of the return light beam is in a range including a prescribed light quantity.

4. The optical disc apparatus according to claim 3, wherein the moving means starts to move the objective lens based on the light quantity detection result of the interference light beam when the light quantity of the return light beam has become smaller than the prescribed light quantity after gradual decrease of the interval.

5. The optical disc apparatus according to claim 3, wherein the laser beam corresponding to the return light beam is a laser beam to be used for recording desired data on the disc-shaped recording medium.

6. A focusing control method in an optical disc apparatus which records desired data on a disc-shaped recording medium by near-field recording that uses an objective lens being held close to the disc-shaped recording medium, comprising the steps of:

applying a focusing laser beam having a prescribed wavelength to the disc-shaped recording medium via the objective lens;

detecting an interference light beam produced by interference between light reflected by the disc-shaped recording medium and light reflected by an exit surface of the objective lens, and obtaining a light quantity detection result; and moving the objective lens along an optical axis thereof based on the light quantity detection result of the interference light beam.

7. The focusing control method according to claim 6, wherein applying step applies the focusing laser beam to the objective lens as a paraxial ray with respect to the optical axis of the objective lens.

8. The focusing control method according to claim 6, further comprising the step of detecting a component of a return light beam that returns from the objective lens and corresponds to part of a laser beam that goes toward the disc-shaped recording medium and shines on the exit surface of the objective lens at angles larger than a critical angle, and obtaining a light quantity detection result, and wherein the moving step moves the objective lens along the optical axis based on the light quantity detection result of the interference light beam in a state that the light quantity detection result of the return light beam indicates that a light quantity of the return light beam is in a range including a prescribed light quantity.

9. The focusing control method according to claim 8, wherein the moving step starts to move the objective lens based on the light quantity detection result of the interference light beam when the light quantity of the return light beam has become smaller than the prescribed light quantity after gradual decrease of an interval between a surface of the disc-shaped recording medium and the exit surface of the objective lens.

* * * * *